Patented July 2, 1946

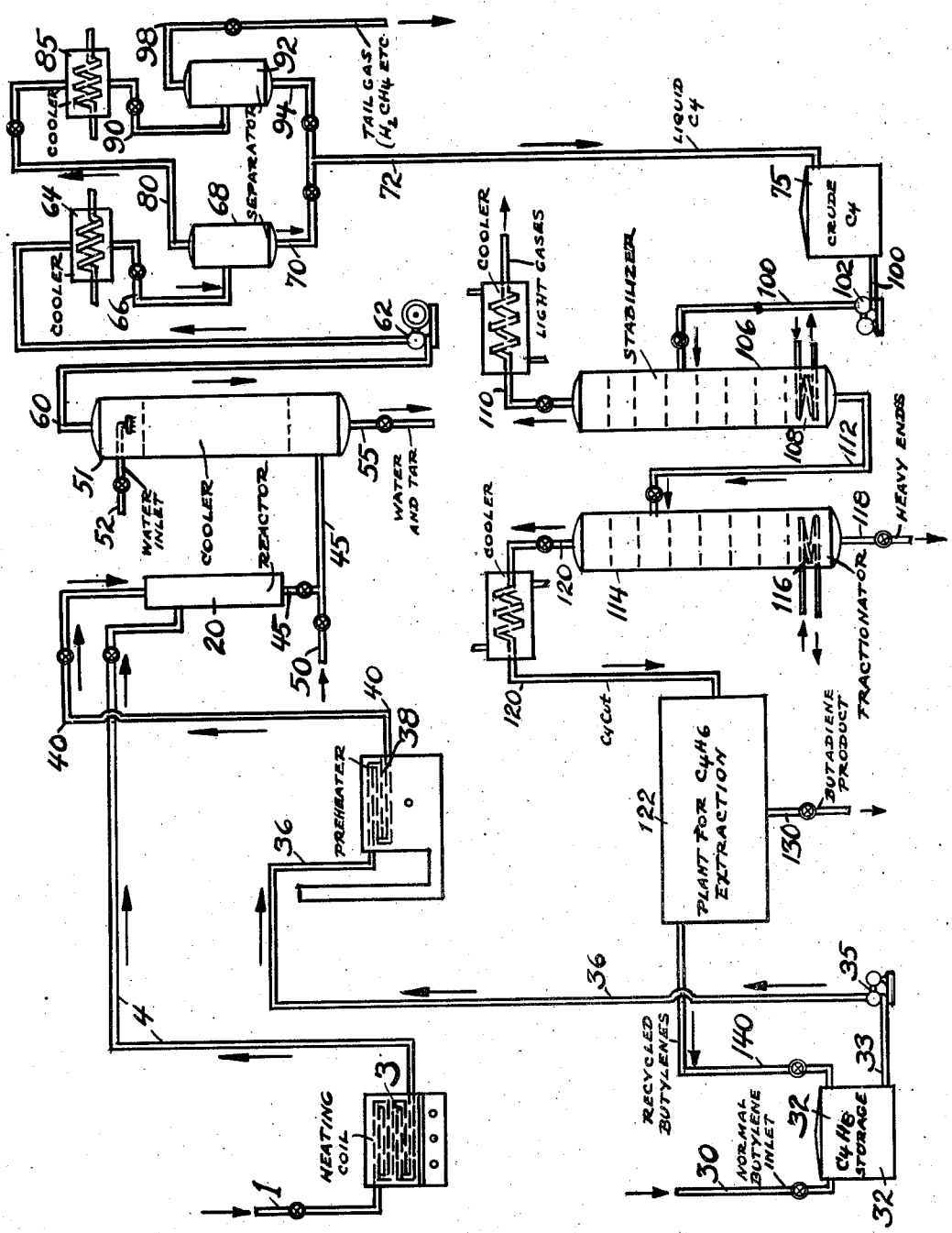

2,403,276

UNITED STATES PATENT OFFICE 2,403,276

CHEMICAL PROCESS

Arthur Donald Green, Cranford, N. J., assignor to Standard Oil Development Company, a corporation of Delaware Application April 2, 1942, Serial No. 437,305

5 Claims. (Cl. 260—680)

The present invention relates to improvements in the art of olefin production and, more particularly, it relates to a method of producing by catalytic dehydrogenation, butadiene from butylene.

According to the present invention, I employ steam during the dehydrogenation of paraffins, or olefins such as butylenes, to form diolefins, but in so doing I supply a substantial portion of the heat necessary to effect the dehydrogenation of the paraffin hydrocarbons or olefins by means of highly superheated steam. When butylene is dehydrogenated in externally heated tubes containing catalyst, and if the chemical heat of reaction must be transferred through the tube walls, then it is necessary to use rather small diameter tubes in order to fulfill the required conditions of short time of contact and a low temperature gradient. The use of such small tubes means that a very large number of them are required, which leads to an expensive reaction furnace. This is particularly serious in the case of the catalytic process.

My invention will be best understood by reference to the accompanying drawing where I have shown diagrammatically an apparatus layout or flow sheet in which my invention may be carried into practical effect.

I shall now describe my invention in detail by means of specific examples and in so doing shall refer to the accompanying drawing.

Referring therefore in detail to the drawing, I represents a line carrying steam from some source, which steam is discharged into a furnace 3 which may be a fixed coil type, a regenerative furnace or any other suitable heating device. The superheated steam is heated to a temperature of from about 1800° F. to 2000° F. in heater 3, whereupon it is discharged into reactor 20 where it is mixed with preheated normal butylenes as will more fully appear hereinafter.

Meanwhile normal butylenes are introduced into the system through line 30, discharged into a fresh feed and recycle storage vessel 32 from which they may be withdrawn through line 33 carrying a pump 35 and thence discharged into a furnace carrying a coil 38. The butylenes are heated in the furnace to a temperature of about say 1100° F. which is below their dehydrogenation temperature, and thereafter the preheated butylenes are discharged through line 40 into the reactor tube 20. The superheated steam and the preheated butylenes are mixed in such proportions in reactor tube 20 as to give the mixture a temperature of about 1000° to 1400° F., preferably from 1150° to 1250° F., and the mixture is permitted to remain in the reactor tube for a very short period of time, for example, for a period of time amounting to about 0.01 to 0.1 second. In this reactor tube the total pressure is about 25 lbs./sq. in. absolute, and the partial pressure of the reactants is about 2 lbs./sq. in. absolute. The quantity of steam at the temperatures indicated fed to the reactor tube 20 is from about 7 to 12 mols steam per mol of hydrocarbon.

In the reactor tube 20, the pressure may be subatmospheric, say of the order of 5 lbs./sq. in. absolute, or it may be as high as 40 lbs./sq. in. absolute.

In the dehydrogenation of butylenes, it is very essential to maintain a very short contact time in order to prevent undesired side reactions or decomposition products, and to this end, therefore, I pass them through the reaction at a sufficient space velocity to give the desired residence time. I then withdraw the reaction products from reactor tube 20 through line 45, and immediately discharge quenching water from line 50 into line 45 in order to lower the temperature of the reactants, and thereafter I discharge the reactants into a cooler 51 where they flow upward against a downflowing spray of water discharged into cooler 50 through line 52. The water serves to cool the reaction products below reaction temperature and also to wash out tar which tar may be withdrawn through line 55. The cooled and washed reaction products are then withdrawn through line 60 carrying a compressor 62 and discharged into a cooler 64 where a portion of the cooled and compressed gases are liquefied and discharged through line 66 into a receiver 68. The hydrocarbons liquefied in cooler 64 are withdrawn through line 70, thence discharged through line 72 into a receiving drum 75. The gaseous hydrocarbons are withdrawn from receiver 68 through line 80, then discharged into a refrigeration means 85 where they are sufficiently cooled to liquefy a major portion of the same, whereupon they are discharged through line 90 into a separator 92. The liquefied hydrocarbons are withdrawn through line 94 and discharged into line 72 for delivery to receiving drum 75. The tail gases consisting of hydrogen, methane, etc., are withdrawn from separator 92 through line 98 and rejected from the system.

The material collected in receiving drum 75 is then stabilized and purified in the following manner: It is first withdrawn through line 100 carrying a pump 102 and thence discharged into a stabilizer 106 carrying a heater 108. In stabilizer 106 the light gases ($C_1$, $C_2$, $C_3$ hydrocarbons) are withdrawn overhead through line 110, while the heavier fractions are withdrawn through line 112 and discharged into a fractionator 114 carrying a heating element 116. In this fractionator 114 the heavy ends ($C_5$ and heavier hydrocarbons) are withdrawn through line 118 while a $C_4$ cut containing the desired butadiene together with unreacted butylenes is withdrawn through line 120 and discharged into an extraction plant represented graphically by 122, where the $C_4$ hydrocarbons are treated with a butadiene solvent. Towers 106 and 114 are provided with the usual reflux means (not shown). Various solvents are suitable for this separation of butadiene from butylenes. For example, I may use acetone, methylamine, ammonia, aqueous cuprous chloride, ammoniacal cuprous acetate and others. I prefer to employ the ammoniacal cuprous acetate in a liquid-liquid extraction process, i. e., to contact the $C_4$ hydrocarbons in liquid phase with the liquid ammoniacal cuprous acetate. The cuprous acetate dissolves the butadiene, and this extract is recovered through line 130. The butadiene product may be recovered therefrom by distillation in known manner in apparatus not shown. The butylenes, on the other hand, are withdrawn through line 140 and recycled to storage drum 32 for processing as previously indicated.

I prefer to employ catalysts such as, for example, one having the following composition which is not affected by steam:

|  | Parts by weight |
|---|---|
| MgO | 78 |
| $Fe_2O_3$ | 20 |
| CuO | 5 |
| $K_2O$ | 2.5 |

In the above composition, which represents a preferred composition as regards this catalyst, it is pointed out that the MgO may vary from 50–95% of the total catalyst composition, the $Fe_2O_3$ may vary from 3–49% of the total composition, the CuO may vary from 0.5–10% of the total composition, and the $K_2O$ may vary from 0.5–10% of the total composition. It is further pointed out that instead of using $K_2O$ as the promoter, I may use CaO or SrO. It is further pointed out that instead of using copper oxide, I may use AgO, ZrO, $Cr_2O_3$, the oxides of manganese, cobalt, nickel, thorium, zirconium, cerium, lead, bismuth and aluminum. Of this latter group aluminum oxide is the best, with chromium oxide next best.

To recapitulate, my present invention relates to improvements in the art of producing olefin, and preferably diolefins such as butadiene from butylenes. It is generally known that the preparation of butadiene from butylenes is a highly sensitive reaction and difficult to control, particularly as to the problem of preventing excessive coke formation and undesired side reactions. My invention is directed towards obviating both of these disadvantages of prior art methods in that I supply the superheat necessary for effecting the desired dehydrogenation by means of steam, and maintain short contact times, while utilizing a catalyst resistant to the effect of steam. In other words, according to my process I heat the butylenes to a temperature which is below dehydrogenation temperature and thereafter discharge them into a reaction vessel where they are admixed with highly superheated steam whereupon the butylenes are heated to reaction temperatures. I further maintain conditions so that the butylenes are in the reactor tube for a short period of time to prevent the undesired side reactions and are thereafter quenched with some cooling fluid which may be oil, water, or even cold catalyst, in order to reduce the temperature of the reaction products, to preserve the yields by preventing undesired side reactions.

While I have emphasized in the preceding description the production of butadiene from butylenes, it will be understood that my invention is sufficiently comprehensive to include dehydrogenation broadly and therefore it includes such reaction as the production of mono-olefins from the corresponding aliphatic hydrocarbons, such as where butylene is produced from butane. It also includes dehydrogenations involving cracking where, for example, propylene is produced from butane.

What I claim is:

1. A process for dehydrogenating butylenes which comprises heating the butylene to a temperature below active dehydrogenation temperature, separately superheating steam, discharging the butylene and the steam into an otherwise substantially unheated reaction zone in such proportions that the butylene is heated to active dehydrogenation temperatures, passing the mixture of butylene and steam through said reaction zone in contact with a catalyst consisting essentially of a major proportion of magnesium oxide and minor proportions of iron oxide, copper oxide, and potassium oxide permitting the butylene to remain resident in the reaction zone for a relatively short period of time, withdrawing reaction products from the reaction zone, rapidly cooling reaction products below reaction temperatures, separating butadiene from the other components of the reaction mass and recovering the said butadiene.

2. The method set forth in claim 1 in which the reaction products remain resident in the reaction zone for a period of from about 0.01–0.1 seconds.

3. The method set forth in claim 1 in which butylene is heated to a temperature in the neighborhood of 1,100° F. and the steam is heated to a temperature of from about 1,800–2,000° F. and in which the steam and the butylene are mixed in the reaction zone in a ratio of from about 12 mols of steam per mol of hydrocarbon.

4. Process of dehydrogenating butylenes to produce butadiene, comprising preheating butylene to a temperature somewhat below active dehydrogenating temperature, superheating steam to a temperature exceeding the dehydrogenating temperature of butylene under the conditions of reaction, mixing the preheated butylene and the superheated steam in a reaction zone heated substantially only by the entering butylene and steam, passing the mixture of butylene and steam through said reaction zone in contact with a catalyst consisting essentially of a major proportion of magnesium oxide and minor proportions of iron oxide, copper oxide, and potassium oxide maintaining the butylene in the reaction zone for a short period only, during which butadiene is formed, and recovering the butadiene.

5. Process according to claim 4, in which the steam is heated to a temperature within the range of from about 1,800 to 2,000° F.

ARTHUR DONALD GREEN.